United States Patent [19]

Sare et al.

[11] 4,045,538

[45] Aug. 30, 1977

[54] CATALYTIC OXIDATION OF VINYL CHLORIDE

[75] Inventors: Edward J. Sare, Clinton; Jerome M. Lavanish, Akron, both of Ohio

[73] Assignee: PPG Industries, Inc., Pittsburgh, Pa.

[21] Appl. No.: 719,535

[22] Filed: Sept. 1, 1976

Related U.S. Application Data

[63] Continuation-in-part of Ser. No. 636,231, Nov. 28, 1975, abandoned.

[51] Int. Cl.$^2$ .............................................. B01D 53/34
[52] U.S. Cl. .................................. 423/240; 423/245; 423/481; 423/488
[58] Field of Search ............... 423/240, 241, 245, 481, 423/488; 55/70, 71

[56] References Cited

U.S. PATENT DOCUMENTS

| | | | |
|---|---|---|---|
| 3,845,191 | 10/1974 | Bruce, Jr. ............................ | 423/240 |
| 3,933,980 | 1/1976 | Smalheiser ........................... | 423/245 |
| 3,972,979 | 8/1976 | Kageyama ........................... | 423/240 |

FOREIGN PATENT DOCUMENTS

| | | | |
|---|---|---|---|
| 1,333,650 | 10/1973 | United Kingdom ................ | 423/240 |

*Primary Examiner*—Earl C. Thomas
*Attorney, Agent, or Firm*—Irwin M. Stein

[57] ABSTRACT

Vinyl chloride is incinerated at relatively mild temperatures, e.g., 20° to 300°C., by contacting it in a combustion zone with an oxygen-containing gas in the presence of hydrated metal oxide catalyst selected from the group consisting of the oxides of manganese, copper, and mixtures of said oxides. The temperature of incineration is adjusted within the range of 20°-300°C. depending on the relative humidity of the gases in the combustion zone to maintain catalytic activity. Commonly, the vinyl chloride is contained in a gas stream in small amounts, e.g., less than 0.05 weight percent.

19 Claims, No Drawings

CATALYTIC OXIDATION OF VINYL CHLORIDE

CROSS REFERENCE TO RELATED APPLICATIONS

This application is a continuation-in-part application of our earlier filed copending application U.S. Pat. Ser. No. 636,231, filed Nov. 28, 1975, and now abandoned.

DESCRIPTION OF THE INVENTION

Vinyl chloride ($C_2HCl$) is a well-known chemical compound that has acquired significant commercial attention. When polymerized with organic free-radical catalysts, e.g., peroxide catalysts, the resulting resin has found utility in a wide variety of applications. Recently, vinyl chloride has been reported to be a suspected carcinogen and consequently human exposure levels have been severely restricted. In areas where vinyl chloride is made or used, e.g., polymerized, gas process streams may be produced containing relatively small but still objectionable quantities of vinyl chloride which cannot be recovered economically. Such process streams may include vents connected to process equipment, such as reactor stripper, condenser and drier vents, storage vessel vents, and process area vents, e.g., reactor building vents. Thus, a need exists for a method for destroying or reducing significantly the vinyl chloride content of such gas streams.

It has been reported that certain halogenated hydrocarbons such as methylchloroform, vinylidene chloride, trichloroethane, tetrachloroethane, and chloroform are susceptible in varying degrees to Hopcalite-catalyzed decomposition with humidified air (about 50 percent relative humidity) at temperatures in excess of 300° C., e.g., 305°–415° C. See, for example, the articles "Catalytic Combustion of Atmospheric Contaminants Over Hopcalite" by J. G. Christian et al, Int. J. Air Wat. Poll., Pergamon Press 1965, Vol. 9, pp. 1–10, and "Catalytic Decomposition of Halogenated Hydrocarbons over Hopcalite Catalyst" by J. K. Musick et al, Ind. Eng. Chem., Prod., Res. Develop., Vol. 13, No. 3, 1974, pp. 175–179.

It has now been discovered that the vinyl chloride content of gas streams containing some can be reduced substantially by contacting the vinyl chloride with oxygen-containing gas in the presence of particular hydrated metal oxide catalysts at temperatures as low as 80°–100° C. Even lower temperatures, e.g., room temperature, i.e., 23° C., have been found effective for short periods of time. Higher temperatures, of course, can be also used. More particularly, it has been found that vinyl chloride can be incinerated at relatively low temperatures, e.g., 100° C., in the presence of hydrated metal oxide catalyst selected from the group consisting of the oxides of manganese, copper, and mixtures of said oxides. The temperature of incineration is adjusted within the range 20°–300° C. depending on the relative humidity of the gas streams in contact with the catalyst, i.e., the relative humidity of the incineration or combustion zone. Under conditions of low relative humidity, e.g., less than 5 percent (measured at 23° C.) temperatures on the low side of the aforesaid temperature range, e.g., 20°–110° C. can be used. For example, at an incineration temperature of about 104° C., it has been found that the vinyl chloride content of a gas stream can be reduced substantially, i.e., to less than about 0.5 parts vinyl chloride per million parts of the gas stream (ppm).

DETAILED DESCRIPTION

Metal oxides that have been found to catalyze the oxidative decomposition of vinyl chloride are the oxides of copper, manganese, and mixtures of such metal oxides. More particularly, the oxides of copper and manganese that can be used are cupric oxide (CuO), manganese sesquioxide hydrated [MnO(OH)], manganese dioxide ($MnO_2$), mixed oxides of manganese in which the formal oxidation state of manganese is II and III, and mixtures of such oxides of manganese with cupric oxide and/or cuprous oxide ($Cu_2O$). Such oxides can also be referred to as copper (I) oxide, copper (II) oxide, manganese (II, III) oxide, e.g., manganomanganic oxide ($Mn_3O_4$), manganese (III) oxide and manganese (IV) oxide, the roman numeral in parenthesis indicating the formal valence of the metal in the metal oxide. Such manganese oxides will be referred to in the specification and claims as "manganese oxides" or equivalent terms. Preferably, the metal oxides are in their higher oxidation state, i.e., manganese (III) and manganese (IV) oxides and copper (II) oxide.

The ratio of manganese oxide to copper oxide in mixtures of such metal oxides can vary broadly. Thus, mixtures of from 99 parts of manganese oxide and 1 part of copper oxide to 1 part of manganese oxide and 99 parts of copper oxide based on the total of such metal oxides can be present. Typically, the weight ratio of manganese oxide to copper oxide in the metal oxide mixture is in the range of 1:1–15:1, e.g., 2:1–13:1, more typically about 6:1–8:1.

The metal oxide content of the active portion of the catalyst is typically at least 70 or 75 weight percent of the catalyst, disregarding catalyst supports, preferably at least 80, e.g., 85–90 weight percent. The remainder of the active catalyst can be minor amounts of other metal compounds, e.g., metal oxide impurities, that do not interfere significantly with the catalytic function of the catalyst, and water of hydration. Metal oxide impurities can be incorporated during preparation of the catalyst or be present in the reactants used to prepare the catalyst.

It is believed from the evidence at hand that some water of hydration associated with the aforesaid metal oxide catalyst is beneficial, vis a vis, the catalytic acitivty of the metal oxide catalyst for the incineration of vinyl chloride. For example, it has been observed that a manganese dioxide catalyst which had little, if any, water of hydration was catalytically inactive, while a manganese dioxide catalyst having significant water of hydration was catalytically active. The presence or absence of water of hydration is related to the temperature seen by the surface of the metal oxide catalyst during its preparation or use. For example, metal oxide prepared by thermal oxidative decomposition of its metal salt at temperatures greater than 500° C., e.g., 530° C., can have little water of hydration associated with the resulting metal oxide and hence would be expected to have little catalytic activity at the temperatures used in the present process.

The total quantity of water associated with the metal oxide catalyst as water of hydration can vary depending on the particular metal oxide or mixtures of metal oxide used and the method of metal oxide preparation. In particular, the drying conditions used in the metal oxide preparation can vary and thereby effect the amount of water of hydration present. It has been found that a metal oxide catalyst having water of hydration in an amount at least as high as that obtained by drying an aqueous filter cake of the precipitated metal oxide or metal oxide mixture at 200° C. for a time sufficient to reach equilibrium yields a catalyst having an adequate level of water of hydration. Such a temperature is sufficient to remove substantially all of the phase water present in the filter cake without excessive loss of water of hydration. Higher drying temperatures can be used; however, care should be exercised when using higher temperatures to prevent complete loss of the water of hydration and the consequent reduction in catalyst activity. Temperatures well in excess of 250° C., e.g., 350°-450° C., are not recommended for drying metal oxide catalyst for the aforesaid reason.

The sufficiency of the water of hydration level of the metal oxide catalyst used can be determined best by utilizing the metal oxide as a vinyl chloride incineration catalyst and observing the catalyst activity, i.e., the reduction in vinyl chloride content of the gas stream treated - a simple expedient for one skilled in the art. As used herein, hydrated metal oxide catalyst of the type heretofore described are those that are capable of removing at least 80, e.g., 90, percent of the vinyl chloride from an air stream containing about 50 ppm vinyl chloride under conditions of less than one (1) percent relative humidity (measured at 23° C.), a reactor temperature of 104° C., a gas flow rate of 9 liters per hour, a catalyst bed L/D ratio (depth of catalyst bed/diameter of catalyst bed) of at least two (2), and an average residence time in contact with the catalyst of 10 seconds. The average residence time is the value obtained by dividing the volume of catalyst by the volumetric rate of flow through the catalyst. Preferably, all of the vinyl chloride in the air stream that is analytically detectable is removed.

The metal oxide catalyst can be used in an unsupported form or can be supported on an inert substrate. By "inert" is meant that the substrate is chemically inert to the metal oxide catalyst deposited thereon and chemically resistant to the components of the vinyl chloride-containing gas stream and the oxidation products resulting therefrom. Examples of suitable inert substrates include: asbestos, pumice, activated charcoal, silica gel, colloidal silica, fumed silica, activated alumina, and clays. When used in a supported form, the amount of catalyst placed on the support should be sufficient to catalyze the oxidative decomposition of the vinyl chloride, i.e., a catalytic amount. The catalytic amount of catalyst placed on a support can be determined by one skilled in the art by routine experimentation.

The metal oxide catalyst can be prepared in any number of ways well-known to those skilled in the art of catalyst preparation. For example, metal oxide catalyst can be prepared by precipitating the hydroxide of the metal or metals desired from a solution of their respective metal salt(s). The precipitate is then dried to remove phase water and partially dehydrate the hydroxide and form the oxide. Typically, drying is performed at temperatures of from 100°-200° C. When a catalyst support is used, the metal hydroxide(s) can be precipitated directly onto the support. In addition, the metal oxides can be prepared by thermal decomposition of other suitable oxygen-containing anion salts of the metals, e.g., nitrates, carbonates and oxalates. Preferably, thermal decomposition should not be conducted at temperatures which dehydrate completely the metal oxide. The surface area of the metal oxide catalyst prepared can vary; but, as in most catalyst applications, relatively high surface areas are preferred.

In the event the metal oxide catalyst becomes deactivated through use (but not permanently poisoned), it is possible to regenerate the catalyst by passing a dehumidified, i.e., less than 5, preferably less than about 2, e.g., less than 1, percent relative humidity (measured at 23° C.), gas stream-containing oxygen, e.g., as provided by air, oxygen, or oxygen-enriched air in intimate contact with the catalyst at elevated temperatures, e.g., about 100° or 150° to 200° C., in the substantial absence of contaminating gases, e.g., hydrogen chloride, vinyl chloride, and high levels of water vapor. The catalyst is contacted with oxygen for a period of time sufficient to regenerate the catalyst, e.g., from 0.5-10 hours. The exact amount of time will of course be dependent on the amount of catalyst, temperature of treatment, and volumetric rate of flow through the catalyst bed. The totally regenerated catalyst appears from the data at hand to be as efficient as freshly prepared catalyst.

The process described herein results in the removal of vinyl chloride from a gas stream containing same. The extent to which vinyl chloride is removed from the gas stream is dependent on the particular conditions of incineration. From the evidence at hand, it is believed that the principal mechanism by which vinyl chloride is removed from the gas stream in the presence of the aforesaid described catalysts is oxidative decomposition (oxidation); however, other mechanisms, e.g., dehydrochlorination may also be involved. As used herein and in the claims, the term "incineration" is intended to mean and include oxidative decomposition alone or oxidative decomposition in combination with other chemical or physical mechanisms, e.g., dehydrochlorination, adsorption, etc.

In accordance with the present process, vinyl chloride is catalytically incinerated at temperatures less than 300° C., e.g., between about 20° C., and about 300° C., e.g., 20°-250° C. At the lower temperatures, e.g., 20°-23° C., catalytic activity falls off rapidly with time; however, in applications such as in gas masks, even a few moments of activity can be important. Temperatures between about 80° C., or 100° C. and about 250° C., e.g., between about 100° and 150° or 200° C., are deemed to be particularly economically desirable. The use of such fairly moderate temperatures, e.g., temperatures of about 100° C., to achieve incineration of vinyl chloride is surprising and represents a significant savings in the heat energy required to incinerate at much higher temperatures. Further, an incineration process that operates at about 100° C. can utilize low pressure waste steam which is readily available in chemical process plants; and, therefore, such process offers significant economic advantages. Still further, temperatures in the range of about 100°-150° or 200° C., are preferred because such temperatures assist in the removal of the products of oxidation, e.g., hydrogen chloride, carbon dioxide and water, from the surface of the catalyst.

The aforesaid temperatures are reactor temperatures as described in the Examples following, i.e., the temperature of the gas stream above the catalyst bed. The temperatures of the catalyst surface are believed slightly higher than the reactor temperature because of the heat of incineration produced by oxidative decomposition of the vinyl chloride.

The particular incineration temperature selected may depend on the relative humidity of the gas stream entering the reactor containing the metal oxide catalyst. From the evidence at hand, it appears that water vapor, i.e., the humidity of the gas, tends to diminish or inhibit the activity of the hydrated metal oxide catalyst. This lowering of activity is more pronounced at temperatures of about 100° C. or less, e.g., 20°-110° C. Therefore, higher temperatures are required to obtain a particular catalyst activity when operating with a humid gas than when operating with a substantially dry gas, i.e., a gas stream having low relative humidity.

As used herein, the relative humidity of a gas stream is the value reported as measured at room temperature (23° C.) and ambient pressure (745 millimeters of mercury). By low relative humidity is intended to mean a relative humidity of less than about 5, e.g., less than 2, percent.

The activity of hydrated metal oxide catalyst used in the present process can be expressed in terms of its efficiency at the conditions of incineration, i.e., the percent of vinyl chloride removed from the gas stream after conditions become constant. The efficiency of the catalyst can be determined by the expression:

$$\frac{(C_i - C_f) \, 100}{C_i}$$

where $C_i$ is the initial concentration of the vinyl chloride in the gas stream and $C_f$ is the final concentration. Thus, the higher the efficiency of the catalyst, the higher is its "activity."

As indicated, the extent of inhibition of the activity of the hydrated metal oxide catalyst by water vapor is temperature dependent. The lower the temperature of incineration, the more pronounced the lowering of catalyst activity. Consequently, for any desired level of catalyst activity, it is possible to either regulate the relative humidity of the gas stream to be treated or the temperature at which treatment is conducted. Thus, the reactor temperature is maintained at a level within the aforesaid described range to inhibit reduction or loss of the hydrated metal oxide catalyst activity by the moisture content of the gas streams contacting the catalyst. The level of catalyst activity may vary depending on the initial concentration of vinyl chloride and the final concentration thereof in the treated stream required by subsequent process treatment, government regulation, etc. It is therefore impossible to set a minimum acceptable level of catalyst activity since such a level is determined by the desires and needs of the operator. However, one skilled in the art, with the information provided herein, can select those operating conditions required to provide the catalyst activity desired.

Generally, the higher the incineration temperature and the lower the relative humidity of the entering gas streams, the higher the catalysts' activity. Therefore, when the amount of heat energy available for incineration or materials of construction limit the incineration temperature to a particular range, the relative humidity of the combined gas streams contacting the catalyst is maintained at a level within said range to maintain catalyst activity at the desired level. On the other hand, if available heat energy or materials of construction do not limit the incineration temperature, the incineration temperature can be adjusted to offset the adverse effect of moisture on the catalyst activity. Thus, within the temperature range of 20°–300° C., e.g., 100°–200° C., either the temperature of incineration or relative humidity of the treated gas streams or both are regulated or maintained at a level at which the level of catalyst activity remains at the desired level. For example, when the incineration temperature is less than about 110° C. it is expected that the relative humidity will be kept as less than 5 percent, e.g., 2 percent and preferably less than 1 percent.

The above-described effect that water vapor has on the activity of the catalyst can be described as a reversible poisoning or inhibition to distinguish the effect from an irreversible poisoning, such as the effect of sulfur compounds on noble metal catalysts, reaction of the catalyst surface, etc. In those cases, the effect on the catalyst is not generally reversible without reworking the catalyst. As the data presented in the Examples show, the reduced efficiency of the catalyst due to an increase in the level of water vapor in the gas stream is reversed by lowering the relative humidity of the gas stream to its former level.

In one embodiment of the present process, the vinyl chloride-containing gas stream to be treated is dehumidified to a desired relative humidity level and then incinerated at temperatures with the range described hereinbefore. The vinyl chloride-containing gas stream can be dehumidified, if necessary, by passing it through a drying column containing a desiccant. Either solid or liquid desiccants can be used to remove water vapor from the gas stream. Examples include: silica gel, activated alumina, fused anhydrous calcium sulfate, lime, magnesium perchlorate, calcium chloride, potassium hydroxide, sulfuric acid, lithium chloride solutions and ethylene glycol. The drying of gases is well-known in the chemical process industry and the means for achieving such drying is not critical to the practice of the present invention. Use of solid desiccants in gas masks to take up water vapor is well-known.

The amount of oxygen used in the oxidation of vinyl chloride in accordance with the present process should be in an amount that is sufficient to oxidize or incinerate the vinyl chloride content of the gas stream, i.e., an oxidizing or incinerating amount. The amount of oxygen should be at least stoichiometrically sufficient to oxidize the carbon content of the vinyl chloride to carbon dioxide and preferably sufficient to oxidize both the carbon content and available hydrogen content of the vinyl chloride to carbon dioxide and water, respectively, in accordance with the following balanced equation:

$$CH_2 = CHCl + 2.5 \, O_2 \rightarrow 2CO_2 + H_2O + HCl \qquad I.$$

The calculated heat of reaction for the reaction represented by the reaction of the aforesaid equation is about 270 kilocalories per mole of vinyl chloride.

Generally the amount of oxygen used will be far in excess of the stoichiometric amounts required in order to insure the total oxidative decomposition of the vinyl chloride. The amount of oxygen used is not critical provided that sufficient quantities are made available to accomplish the oxidation of the vinyl chloride. The oxygen can be provided by utilizing any suitable source, e.g., air, oxygen, or oxygen-enriched air. The oxygen-containing stream, if separate from the vinyl chloride-containing stream, can also be dehumidified to a low relative humidity before being mixed with the vinyl chloride-containing stream.

In carrying out one embodiment of the process of the present invention, the vinyl chloride-containing gas stream is dehumidified, if necessary, and mixed with dehumidified oxygen-containing gas (if used) and introduced into a preheater. In the event the vinyl chloride-containing gas stream is sufficiently dry or already contains sufficient quantities of oxygen, no additional drying or mixing with an oxygen-containing stream is required. This may well be the situation in the latter case where an area in which vinyl chloride may be present is well ventilated and the exhausted vent gas process stream is to be treated in accordance with the present invention. The dehumidified vinyl chloride contaminated gas stream - oxygen gas mixture is preheated, if necessary, e.g., to 80° or 100° C., and the resultant heated gas stream introduced into a catalytic reactor in which the hydrated metal oxide catalyst has been placed, e.g., as a fixed or fluid bed. Preheating should be conducted to the approximate temperature at which incineration is to be conducted, i.e., the reactor temperature. While preheating can be performed before dehumidification, this is not desired economically.

According to known techniques, the catalyst bed diameter in an integral fixed-bed flow-type catalytic reactor should be at least six times, and bed depth at least 30 times the effective catalyst particle diameter to keep the bed edge and end effect suitably small. The preheated vinyl chloride-containing gas stream is maintained in contact with the hydrated metal oxide catalyst for a time sufficient for the oxidation reaction to occur. Contact times of from about 2 to 10 seconds at 100° C., under conditions of low relative humidity have been found to be sufficient. The gas stream exiting from the catalytic reactor(s) is reduced in vinyl chloride. Preferably the reactor effluent is substantially free of vinyl chloride, e.g., less than 10 ppm, more preferably less than 5 ppm, most preferably less than 1 ppm, of vinyl chloride, and is cooled prior to disposal. It is advantageous to pass the reactor effluent stream through, for example, a caustic scrubber to remove hydrogen chloride, which is an oxidation or dehydrochlorination product, before disposing of the other innocuous gas products. While only one catalyst bed has been described more than one such bed can be used. For example, multiple separate beds in sequence can be used. Such beds can be in one unit, e.g., stacked beds, or in separately housed units.

The apparatus in contact with the vinyl chloride and its oxidation products is constructed typically from acid resistant construction materials to minimize corrosion problems. Examples of metallic construction materials include monel, nickel, and stainless steel. Acid resistant engineering plastics, such as Teflon (a trademark of E. I. duPont deNemours and Company for polytetrafluoroethylene) and Ryton (a trademark of Phillips Petroleum Co. for polyphenylene sulfide resins) can be used in the construction of the apparatus as a result of the low temperatures that can be used in the practice of the oxidation process described herein.

The present process is more particularly described in the following Examples which are intended as illustrative only since numerous modifications and variations therein will be apparent to those skilled in the art.

EXAMPLE I

Nitrogen containing about 50 parts per million of vinyl chloride was mixed with oxygen to produce a stream with the approximate composition of air, i.e., about an 80 volume percent/20 volume percent nitrogen/oxygen gas stream. This synthetic air stream had a dew point of less than −25° C. (relative humidity of less than 2 percent). The small amount of vinyl chloride in the nitrogen was disregarded in calculating the 80/20 volume percent nitrogen/oxygen mixture.

The vinyl chloride-containing synthetic air stream was introduced into a preheater, which consisted of a tightly wound coil approximately 2.5 inches in diameter and 2.5 inches in height which was fabricated from 0.25 inch diameter stainless steel tubing. The coil was placed in a 700 watt electric furnace and heated to the temperature desired at the inlet gas stream temperature to the reactor. The preheated synthetic air stream was introduced into the bottom of a vertical catalytic reactor, which was constructed of 0.75 inch diameter 316 stainless steel and which measured approximately 8 inches in length. The catalyst was supported on a 35 mesh stainless steel screen which was located approximately 1.5 inches above the synthetic air stream inlet. A second screen was placed on the top of the catalyst bed to prevent the possible ejection of catalyst particles. Two thermocouples were inserted into the reactor approximately 0.5 inch above, and below, the catalyst bed to monitor the synthetic air stream temperatures. These thermocouples were positioned such that the junction was located in the center of the reactor. The reactor was insulated with asbestos tape to minimize heat loss and was heated by means of a heating tape. The thermocouple located approximately 0.5 inch above the catalyst bed was utilized as the catalyst bed temperature reference, i.e., the reactor temperature.

About 20 cc (15 grams) of a commercially available Hopcalite catalyst was charged to the reactor as the catalyst bed. Elemental X-ray analysis of the catalyst indicated that the manganese and copper content was 81 weight percent as manganese dioxide, and 10 weight percent as copper (II) oxide, with minor amounts (about 5.1 weight percent) of compounds containing potassium, calcium, and sulfur. The remainder of the catalyst, i.e., about 3.9 weight percent, is considered to be water of hydration. The catalyst was composed of particles of minus 14 mesh and had a B.E.T. surface area of 204 square meters/gram. Thermogravimetric analysis of a sample of the catalyst to 400° C. indicated a total weight loss of about 5.6 percent.

The reactor gas effluent was cooled to ambient temperature by means of an approximately 40 inch U-shaped section of 0.25 inch diameter stainless steel tubing, which was immersed in a water bath. The cooled reactor gas effluent was exhausted to a laboratory hood. At various times during the period in which the synthetic air stream containing vinyl chloride was introduced into the reactor, samples were taken of the gas stream inlet to the preheater and of the reactor gas stream effluent exiting the cooler in order to assess the vinyl chloride concentration of the gas stream before and after the catalytic reactor. The vinyl chloride concentration of such gas streams was measured by gas-liquid chromatography utilizing flame ionization detectors. The total gas flow rate to the reactor was measured as was the inlet and outlet temperatures to the reactor. The data accumulated is found in Table I.

The data of Table I show that no detectable concentration of vinyl chloride was found in the reactor effluent gas stream at each of the reactor operating temperatures in the range of from about 50°-300° C. (sample 1-12). In order to establish that the incineration of vinyl chloride was occurring with the oxygen from the synthetic air stream rather than from the oxygen present in the catalyst, the oxygen flow to the reactor was discontinued. Within five minutes from the discontinuation of the oxygen flow, a detectable concentration of vinyl chloride was found in the gas stream effluent from the reactor, (sample No. 13). The oxygen flow to the reactor was resumed and within 11 minutes after the reintroduction of oxygen to the reactor during which further cooling of the reactor occurred, no detectable concentration of vinyl chloride was found in the reactor effluent gas stream (run 14). This data shows that in the presence of gaseous oxygen there is catalytic oxidation of vinyl chloride.

The reactor was permitted to cool to ambient conditions (sample No. 15) and the data show that there was no detectable concentration of vinyl chloride in the reactor effluent gas for at least 1 hour. The system was permitted to operate under ambient conditions overnight and as shown by sample No. 16, the catalytic activity had decreased significantly. However, when the reactor temperature was raised to about 100° C., the catalytic activity was found to increase significantly (runs 17-19).

Regeneration of the catalyst bed was attempted by introducing oxygen only to the bed at a bed temperature of about 100° C. After this regeneration, the catalyst activity was found to have increased to the extent that no detectable concentration of vinyl chloride was found in the reactor effluent gas (sample No. 20). The system was permitted to operate continuously overnight at the conditions existing at the time sample No. 20 was taken. However, the catalytic activity decreased during such operation as shown by sample No. 21 Qualitative X-ray analysis of the catalyst indicated that some structural transformations of the catalyst had occurred. In addition, the analysis indicated that some chloride had been formed on the catalyst. Consequently, it is believed that some loss in catalytic activity occurred during the overnight operation at ambient temperatures in which the water vapor product and hydrochloric acid may have been adsorbed on the catalyst.

EXAMPLE II

The apparatus described in Example I was modified to permit controlled amounts of the vinyl chloride-containing synthetic air stream entering the reactor to be humidified by means of passage through a simple water bubbler. The degree of humidification was controlled by proportioning the relative amount of the gas stream which passed through the bubbler. The catalyst bed was filled with a fresh charge of about 13 cc (11.9 grams) of the Hopcalite catalyst used in Example I. About 44 liters per hour of the vinyl chloride-containing synthetic air gas stream was passed into the reactor at low relative humidity, i.e., less than 2 percent. The outlet temperature of the gas stream from the catalyst bed was maintained at 104° C. After one hour of operation, the relative humidity of the gas stream to the reactor was increased to about 50 percent. After about one and one-half hours of further operation, the relative humidity level of the inlet gas stream to the reactor was lowered to the earlier level of less than 2 percent by discontinuing humidification. The data obtained appears in Table II.

The catalyst bed was allowed to dry in the reactor at 104° C. overnight with the passage of an 80/20 nitrogen/oxygen gas stream (and in the absence of vinyl chloride) at a relative humidity level of approximately 0.6 percent. Vinyl chloride-containing synthetic air gas at various levels of relative humidity was reintroduced to the reactor over approximately seven hours. Thereafter, the system was operated overnight as a relative humidity level of about 0.6 percent. The data appears in Table III.

TABLE I

| Sample Number | Total Flow Rate (liter/hr.) | Gas Stream Temp. at Catalyst Bed, ° C. | | Gas Stream VCM[a] Conc., ppm[c] Catalyst Bed | | Time of Operation at Listed Conditions, Hr. | Comments |
|---|---|---|---|---|---|---|---|
| | | Inlet | Outlet | Inlet | Outlet | | |
| 1 | 9 | 340 | 300 | 44 | ND[b] | 0.75 | |
| 2 | 9 | 340 | 300 | 44 | ND | 0.25 | |
| 3 | 31 | 290 | 300 | 41 | ND | 0.5 | |
| 4 | 44 | 280 | 300 | 40 | ND | 1 | |
| 5 | 44 | 240 | 250 | 39 | ND | 1 | |
| 6 | 44 | 204 | 203 | 43 | ND | 0.5 | |
| 7 | 44 | 192 | 203 | 43 | ND | 0.5 | |
| 8 | 44 | 142 | 149 | 43 | ND | 0.5 | |
| 9 | 44 | 100 | 104 | 43 | ND | 0.4 | |
| 10 | 44 | 100 | 104 | 43 | ND | 0.1 | |
| 11 | 44 | 61 | 68 | 43 | ND | — | Sample obtained during cooling |
| 12 | 44 | 53 | 51 | 43 | ND | 0.5 | |
| 13 | 36 | 36 | 27 | 52 | 0.5 | 0.1 | No O$_2$ feed |
| 14 | 44 | 29 | 24 | 43 | ND | 0.25 | |
| 15 | 44 | 23 | 23 | 43 | ND | 1.0 | |
| Left overnight at ambient temperature, 44 liter/hr. flow, 43 ppm VCM | | | | | | | |
| 16 | 44 | 23 | 23 | 48 | 36 | 15.5 | |
| 17 | 44 | 81 | 100 | 47 | 1.5 | 0.25 | |
| 18 | 44 | 81 | 100 | 47 | 1.5 | 1.5 | |
| 19 | 44 | 81 | 100 | 47 | 3 | 4.5 | |
| No N$_2$/VCM flow for 1 hour - O$_2$ only at a rate of 8 liter/hr. | | | | | | | |
| 20 | 44 | 81 | 100 | 43 | ND | 0.5 | |
| Left overnight at this temperature, 44 liter/hr. flow, 43 ppm VCM | | | | | | | |
| 21 | 44 | 79 | 100 | 46 | 17 | 17.5 | |

[a]vinyl chloride
[b]ND denotes - not detected
[c]all values rounded to 0.5 ppm

TABLE II

| Sample No. | Inlet Temp.[a] | % Rel. Humid.[b] | VCM Concentration[c] | | % Diff.[d] | Total Time of Operation, Hrs.[e] |
|---|---|---|---|---|---|---|
| | | | Inlet | Outlet | | |
| 1 | 110 | 1.5 | 43.0 | ND | >99 | 0.40 |
| 2 | 108 | 1.2 | 43.0 | ND | >99 | 1.00 |
| 3 | 108 | 54 (18) | 43.0 | 5.5 | 85 | 1.80 |
| 4 | 108 | 50 (60) | 45.5 | 15.5 | 65 | 2.60 |
| 5[f] | 108 | 1.4 | 45.5 | 4.5 | 90 | 2.90 |

TABLE II-continued

| Sample No. | Inlet Temp.[a] | % Rel. Humid.[b] | VCM Concentration[c] Inlet | VCM Concentration[c] Outlet | % Diff.[d] | Total Time of Operation, Hrs.[e] |
|---|---|---|---|---|---|---|
| 6[g] | 108 | 1.2 | 47.0 | Trace | >99 | 3.20 |

[a] Gas stream temperature at inlet to catalyst bed in ° C.
[b] Relative humidity (%) of gas stream at 23° C. Numbers in parentheses refer to the period of time in minutes that the humidified gas stream was used before the sample was obtained.
[c] Vinyl chloride concentration in ppm; ND denotes not detected; trace denotes ≤0.2 ppm
[d] % difference in the VCM concentration of the inlet and outlet gas stream
[e] Approximate total time of operation with respect to VCM being present in the gas stream
[f] Sample obtained 8 minutes after discontinuing increased relative humidity atmosphere
[g] Sample obtained 24 minutes after discontinuing increased relative humidity atmosphere

TABLE III

| Sample No. | Inlet Temp.[a] | % Rel. Humid.[b] | VCM Concentration[c] Inlet | VCM Concentration[c] Outlet | % Diff.[d] | Total Time of Operation, Hrs.[e] |
|---|---|---|---|---|---|---|
| 7[f] | 108 | 1.0 | 46.0 | ND | >99 | 0.60 |
| 8 | 108 | 8.5 (13) | 46.0 | ND | >99 | 1.20 |
| 9 | 108 | 8.5 (31) | 46.0 | 2.0 | 95 | 1.50 |
| 10 | 108 | 10 (83) | 46.0 | 7.5 | 85 | 2.40 |
| 11[g] | 108 | 0.8 | 46.0 | ND | >99 | 3.70 |
| 12 | 108 | 25 (44) | 46.0 | 19.0 | 60 | 4.85 |
| 13 | 107 | 25 (78) | 45.5 | 23.0 | 50 | 5.40 |
| 14[h] | 107 | 0.8 | 45.5 | 0.5 | 99 | 6.80 |
| 15[i] | 108 | 0.6 | 45.5 | 2.0 | 95 | 23.6 |

[a]-[e] See Table II
[f] Remaining samples obtained after passing N$_2$/O$_2$ stream only through catalyst bed overnight at 104° C. and approximately 0.6% relative humidity.
[g] Sample obtained 76 minutes after discontinuing increased relative humidity atmosphere
[h] Sample obtained 79 minutes after discontinuing increased relative humidity atmosphere
[i] Sample obtained after passing N$_2$(VCM)/O$_2$ stream through catalyst bed overnight at 104° C. and approximately 0.6% relative humidity.

The data of Table II shows that a low relative humidity, i.e., less than 2 percent and a reactor temperature of about 104° C., no detectable quantity of vinyl chloride was found in the reactor effluent gas during the initial first hour of operation. However, when the relative humidity of the gas stream introduced into the reactor was increased from about 1.2 percent to about 50 percent, a relatively rapid loss of catalytic activity toward vinyl chloride is observed. Thus, after about 18 minutes of operation at high relative humidity conditions (sample no. 3), the catalyst activity had decreased by about 15 percent and after about 60 minutes of such operation, catalytic activity had decreased by about 35 percent. When, however, the relative humidity of the gas inlet stream was reduced to the earlier low levels, catalytic activity was found to increase relatively rapidly. This result indicates that water vapor is an inhibitor of catalytic activity rather than a catalyst poison.

The data of Table III shows that the activity of the catalyst can be regenerated by contact with an oxygen-containing gas in the absence of contaminating gases, e.g., vinyl chloride. Thus, after overnight drying at 104° C. with passage of a synthetic air stream through the catalyst bed, catalytic activity was found to be restored to the initial level, i.e., no detectable concentration of vinyl chloride was found in the reactor gas effluent (sample no. 7). The data of Table III shows also that at relative humidity level of approximately 8–10 percent and 25 percent, significant losses in catalytic activity with time are observed.

EXAMPLE III

To a solution of 20 grams of anhydrous sodium hydroxide dissolved in 40 grams of distilled water was added slowly a solution of 33.8 grams of manganese (II) sulfate monohydrate dissolved in 300 grams of distilled water with vigorous stirring. The stirring was continued for approximately 1-2 minutes in order to minimize the possibility of air oxidation of the precipitated product. The precipitate was thoroughly washed with distilled water by decantation utilizing a centrifuge operation. The precipitate was washed a total of four times. After washing, the precipitated product was isolated by filtration and the wet filter cake dried at approximately 50° C under a vacuum of 27 inches of mercury for about 40 minutes. After this drying operation, the filter cake was broken up using a mortar and pestle into a −8 mesh particle size product. The −8, +30 mesh fraction of this product was dried at approximately 200° C. for about 5 hours, 2 hours of which were under a vacuum of 27 inches of mercury. X-ray diffraction analysis indicated that the sample contained a crystalline phase, and that the diffraction pattern of this phase corresponds to Mn$_3$O$_4$. X-ray elemental analysis indicated that the manganese content of the sample was 86.7 weight percent as Mn$_3$O$_4$. Thermogravimetric analysis of a sample of the product to 400° C. indicated a total weight loss of 1.8 percent.

EXAMPLE IV

Using the apparatus and the test procedure of Example II, eight grams of the manganese oxide catalyst of Example III was charged to the reactor. Results are tabulated in Table IV.

TABLE IV

| Sample No. | Inlet Temp.[a] | Flow Rate[f] | % Rel. Humid.[b] | VCM Concentration[c] Inlet | VCM Concentration[c] Outlet | % Diff.[d] | Time of Operation[e] |
|---|---|---|---|---|---|---|---|
| 1 | 103 | 44 | 1.1 | 43 | 19 | 55 | 0.10 |
| 2 | 103 | 9 | 1.5 | 43 | 0.5 | 99 | 0.25 |
| 3 | 103 | 9 | 1.8 | 43 | 1.0 | 98 | 0.50 |
| 4 | 103 | 9 | 52 (15) | 43 | 34.5 | 20 | 0.90 |

TABLE IV-continued

| Sample No. | Inlet Temp.[a] | Flow Rate[f] | % Rel. Humid.[b] | VCM Concentration[c] Inlet | Outlet | % Diff.[d] | Time of Operation[e] |
|---|---|---|---|---|---|---|---|
| 5 | 100[g] | 9 | 2.5 | 43 | 14 | 67 | 1.10 |

[a]-[e]See Table II
[f]Flow rate in liters per hour
[g]Sample obtained 8 minutes after discontinuing increased relative humidity atmosphere The data of Table IV shows that the manganese oxide prepared in Example III is effective as a catalyst for incineration of vinyl chloride at temperatures of about 104° C. with sufficient contact time, i.e., at a flow rate of 9 liters per hour (see samples nos. 2 and 3). The data of Table IV also shows that the catalytic activity of this catalyst is inhibited by the presence of water vapor in the atmosphere.

EXAMPLE V

Forty-two grams of finely-ground manganese (II) sulfate monohydrate was slurried with 31.6 grams of distilled water in a 250-ml round-bottom flask which was fitted with a thermometer and paddle stirrer. After addition of 165.2 grams of sulfuric acid to the slurry with stirring, the resulting suspension of manganese (II) sulfate in sulfuric acid solution was allowed to cool to 56° C. At this temperature, addition of 37.6 grams of potassium permanganate to the suspension was initiated. The potassium permanganate was added slowly over a period of about 20 minutes with vigorous stirring. After completion of the potassium permanganate addition, the reaction mixture was stirred for about 15 minutes. The resulting reaction product was poured slowly into one gallon of distilled water with vigorous stirring to precipitate the manganese dioxide. The precipitated product was washed thoroughly with distilled water until a negative sulfate test was obtained. The multiple washing of the precipitated product was performed by decantation utilizing a centrifuge. The washed product was isolated by filtration.

About 40 grams of the wet manganese dioxide filter cake was slurried in distilled water and refiltered. The filter cake was compressed between felt pads and dried at approximately 50° C. for two hours. The dried cake was broken up with a mortar and pestle to a minus 4 mesh particle size. These particles were then dried at approximately 200° C. for four hours. X-ray diffraction analysis indicated that the sample was amorphous in form. X-ray elemental analysis indicated that the manganese content of the sample was 87.5 weight percent, as $MnO_2$. Thermogravimetric analysis of a sample of the product to 400° C. indicated a total weight loss of 11.7 percent.

EXAMPLE VI

Utilizing the apparatus and procedure of Example II, the manganese dioxide was tested as a vinyl chloride for incineration catalyst at a reactor temperature of about 104° C. Five grams of the manganese dioxide catalyst (about 11.5 cc) was charged to the reactor bed. Results are tabulated in Table V.

TABLE V

| Sample No. | Inlet Temp.[a] | Flow Rate[f] | % Rel. Humid.[b] | VCM Concentration[c] Inlet | Outlet | % Diff.[d] | Time of Operation[e] |
|---|---|---|---|---|---|---|---|
| 1 | 106 | 9 | 2.1 | 45.5 | ND | >99 | 0.25 |
| 2 | 106 | 9 | 2.0 | 45.5 | ND | >99 | 0.75 |
| 3 | 106 | 44 | 1.0 | 45.5 | Trace | >99 | 1.35 |
| 4 | 106 | 44 | 0.9 | 45.5 | Trace | >99 | 1.75 |
| 5 | 106 | 44 | 50 (14) | 45.5 | 15 | 67 | 2.10 |
| 6 | 110[g] | 44 | 0.9 | 45.5 | ND | >99 | 0.40 |
| 7 | 110 | 44 | 4.8 (31) | 45.5 | 1.0 | 98 | 1.10 |
| 8 | 110[h] | 44 | 0.9 | 45.5 | 0.5 | >99 | 1.35 |

[a]-[e]See Table II
[f]Total 80/20 $N_2/O_2$ flow rate in liters/hr.
[g]Remaining samples obtained after passing $N_2/O_2$ stream only through catalyst bed overnight at 110° C. and approximately 0.5% relative humidity.
[h]Sample obtained 11 minutes after discontinuing increased relative humidity atmosphere.

The data of Table V show that at reactor temperatures of 104° C. and under conditions of low relative humidity, manganese dioxide exhibits a high level of catalytic activity for incineration of vinyl chloride. See, for example, Samples 1-4 and 6-8. Although a trace of vinyl chloride was found in the reactor gas effluent at high flow rate, such result is not deemed significant in view of the relatively small catalyst loading, i.e., 5 grams, utilized. The data of Table V also show that in the presence of relatively high levels of water vapor (Sample 5) catalytic activity appears to be inhibited. However, a return to low relative humidity conditions restored catalytic activity.

EXAMPLE VII 81 grams of the moist manganese dioxide filter cake prepared in Example V was slurried in 70 grams of distilled water. 6.1 grams of anhydrous sodium carbonate was dissolved in 20 grams of distilled water utilizing a hot plate to warm the solution. 5.5 grams of anhydrous copper (II) sulfate was similarly dissolved in 20 grams of distilled water. After addition of the sodium carbonate solution to the manganese dioxide suspension with stirring, the copper (II) sulfate solution was added slowly to the suspension with stirring. After isolation of the mixed precipitate by filtration, the wet filter cake was compressed between felt pads using a hydraulic press. After compression, the filter cake was dried in an approximately 50° C. oven for about 17 hours. The dried cake was then broken up with a mortar and pestle into minus 4 mesh particles. These particles were dried at approximately 200° C. for a period of approximately 4 hours. The manganese and copper content of the mixed metal oxide was determined to be about 83.2 weight percent as manganese dioxide and about 9.6 weight percent as copper (II) oxide, as determined by X-ray spectroscopic analysis. The weight ratio of manganese dioxide/copper (II) oxide was approximately 8.7/1. Thermogravimetric analysis of a sample of the mixed metal oxide product to 400° C. indicated a total weight loss of 5.8 percent. About 5.7 weight percent of the mixed oxide was water.

Utilizing the apparatus and procedure of Example II, 7.5 grams of the aforesaid metal oxide mixture was charged to the reactor. The catalyst was tested for about 3½ hours total operating time at a reactor temperature of 104° C. Thereafter, the catalyst was removed from the reactor bed and reground to a sample having a maximum particle size of 8 mesh. The reactor bed was recharged with this catalyst (about 7 grams) and this finer particle size metal oxide mixture tested. Results are tabulated in Table VI.

EXAMPLE IX

To a solution of 288 grams of distilled water and 400 grams of sulfuric acid in a 1000 milliliter beaker, 42.5 grams of manganese (II) sulfate monohydrate was added with stirring. At a temperature of 65° C., the addition of 118.7 grams potassium permanganate to the solution was begun. The potassium permanganate was added slowly with vigorous stirring over a period of 40 minutes such that the temperature of the reactants was maintained in the range of 64°-66° C. After completion of this addition, the reactant mixture was stirred for a period of 35 minutes. After this period of time, the reaction mixture was poured slowly into approximately

TABLE VI

Summary of 8.7/1 $MnO_2$-CuO-VCM Incineration Testing

| Sample No. | Inlet Temp.[a] | Flow Rate[f] | % Rel. Humid.[b] | VCM Concentration[c] Inlet | Outlet | % Diff.[d] | Time of Operation[e] |
|---|---|---|---|---|---|---|---|
| 1 | 106 | 44 | 0.8 | 45.5 | 21.5 | 55 | 0.30 |
| 2 | 106 | 9 | 1.7 | 45.5 | 3.5 | 90 | 0.40 |
| 3 | 106 | 9 | 1.8 | 45.5 | 4.0 | 90 | 0.80 |
| 4 | 106 | 9 | 53 (21) | 45.5 | 10.0 | 80 | 1.50 |
| 5 | 106 | 9 | 53 (98) | 45.5 | 26.0 | 45 | 2.80 |
| 6 | 106[g] | 9 | 2.3 | 45.5 | 15.0 | 65 | 3.60 |
| 7 | 106[h] | 44 | 0.8 | 45.0 | 15.5 | 65 | 0.20 |
| 8 | 106[h] | 9 | 1.7 | 45.0 | 0.5 | >99 | 0.50 |
| 9 | 106[h] | 9 | 1.7 | 45.0 | 0.5 | >99 | 0.60 |

[a-e] See Table II
[f] Total 80/20 $N_2/O_2$ flow rate in liter/hour.
[g] Sample obtained 48 minutes after discontinuing increased relative humidity atmosphere. A total 20/1 $N_2/O_2$ flow of approximately 37 l/hr. was used at a relative humidity of 1.1% for 26 minutes of this period.
[h] 7 g of oxide mixture used as catalyst. Maximum particle size, 8 mesh.

The data of Table VI show that the 8.7/1 manganese dioxide-copper (II) oxide catalyst mixture was catalytically active (Samples 1-6). The catalytic activity of the metal oxide mixture of this example was initially lower than that of the similar metal oxide mixture of Example I. However, after regrinding the metal oxide to a finer particle size, the catalytic activity was found to show a significantly increased level of activity. As with the other manganese dioxide-copper (II) oxide catalysts, the catalyst activity was found to decrease with increased relative humidity.

EXAMPLE VIII

Using the procedure described in Example VII, 61 grams of the moist manganese dioxide filter cake of Example V was slurried in 51 grams of distilled water and reacted with 18.2 grams of anhydrous sodium carbonate dissolved in 60 grams of distilled water and 16.5 grams of anhydrous copper (II) sulfate dissolved in 60 grams of distilled water. The manganese and copper content of the resulting dried mixed oxide was found to be about 63 weight percent, as manganese dioxide, and about 27.8 weight percent as copper (II) oxide, i.e., a weight ratio of about 2.3/1. Thermogravimetric analysis of a sample of the mixed metal oxide to 400° C. indicated a total weight loss of about 6.3 percent.

Utilizing the apparatus and procedure of Example II, 11 grams of the mixed oxide was charged to the reactor and tested. Results are tabulated in Table VII.

0.75 gallon of distilled water with vigorous stirring to precipitate the manganese dioxide. The precipitated product was then washed and isolated by centrifugation and decantation.

90 grams of the wet centrifuge cake was slurried in 125 grams of distilled water. 6.1 grams of anhydrous sodium carbonate was dissolved in 20 grams of distilled water utilizing a hot plate to warm the solution. 5.5 grams of anhydrous copper (II) sulfate was dissolved in 20 grams of distilled water utilizing the same procedure. The copper sulfate solution was then added to the warm sodium carbonate solution with stirring. The precipitated copper (II) carbonate was washed thoroughly with distilled water until a negative sulfate test was obtained. A suspension of the washed copper (II) carbonate was then added to the suspension of manganese dioxide with stirring. The co-precipitate was then isolated by filtration and dried over-night in a 50° C. oven. The dried filter cake was then broken up with a mortar and pestle with a minus 8, plus 30 mesh fraction dried at approximately 200° C. for a period of 4 hours. The manganese and copper content of the mixed metal oxide was found to be about 81.3 weight percent, as manganese dioxide, and about 6.3 weight percent, as copper (II) oxide, or a weight ratio of 12.9/1.

Thermogravimetric analysis of a sample of the mixed metal oxide to 400° C. indicated a total weight loss of about 6.2 percent.

Utilizing the apparatus and procedure of Example II, 10 grams of the aforesaid nominal 13/1 metal oxide mixture was charged to the reactor and tested.

Results are tabulated in Table VII.

TABLE VII

Summary of the 2.3/1 and, 13/1 MnO$_2$-CuO-VCM Incineration Testing

| Sample No. | Catalyst | Inlet Temp.[a] | Flow Rate[f] | %Rel. Humid.[b] | VCM Concentration[c] Inlet | Outlet | % Diff.[d] | Time of Operation[e] |
|---|---|---|---|---|---|---|---|---|
| 1 | 2.3/1 MnO$_2$/CuO | 111 | 44 | 0.8 | 47.0 | 1.0 | 98 | 0.20 |
| 2 | | 111 | 44 | 0.7 | 47.0 | 3.5 | 90 | 0.50 |
| 3 | | 111 | 44 | 0.7 | 47.0 | 8.0 | 85 | 1.20 |
| 1 | 13/1 MnO$_2$/CuO | 111 | 44 | 1.0 | 37.0 | N.D. | >99 | 0.05 |
| 2 | | 111 | 44 | 47 (11) | 37.0 | 6.0 | 85 | 0.30 |
| 3 | | 111 | 44 | 57 (21) | 37.0 | 12.5 | 65 | 0.65 |
| 4 | | 111[g] | 44 | 1.9 | 37.0 | N.D. | >99 | 0.15 |

[a-e] See Table II
[f] Total 80/20 N$_2$/O$_2$ flow rate in liters/hour.
[g] Remaining sample obtained after allowing catalyst to heat at 104° C. for approximately 3½ days without gas flow through the reactor.

The data of Table VII shows that both the 2.3/1 and nominal 13/1 weight ratio manganese dioxide-copper (II) oxide mixtures were also found to show relatively high levels of catalytic activity with respect to vinyl chloride incineration. Thus, under low relative humidity conditions, both samples were initially found to remove at least 98 percent of the vinyl chloride from the reactant gas stream at a reactor temperature of 104° C. In the case of the 13/1 mixed oxide sample, the inhibiting effect of water vapor on the catalytic activity was again shown.

EXAMPLE X 80 grams of the wet centrifuge cake obtained in the preparation of manganese dioxide in Example IX was slurried in approximately 200 grams of distilled water. To a solution of 4 grams of anhydrous sodium hydroxide dissolved in 200 grams of distilled water, 30 grams of commercial anhydrous copper (I) oxide was added with stirring. After a thorough washing, utilizing the centrifuge operation described hereinbefore, 23 grams of the wet copper (I) oxide centrifuge cake was slurried in approximately 200 milliliters of distilled water. The suspension of copper (I) oxide was then added slowly to the manganese dioxide suspension with stirring. After isolation of the mixed precipitate by filtration, the wet filter cake was dried overnight at approximately 50° C. The dried precipitate was then broken up with a mortar and pestle and a minus 8, plus 30 mesh particle size fraction dried at approximately 200° C. for a period of four days. The manganese and copper content of the mixed metal oxide was found to be approximately 50.3 weight percent as manganese dioxide, and 36.8 weight percent as copper (I) oxide, as determined by X-ray spectroscopic analysis, i.e., about a 1.4/1 weight ratio. Thermogravimetric analysis of a sample of the mixed metal oxide to 400° C. indicated a total weight loss of about 6.7 percent.

Utilizing the apparatus and procedure of Example II, 7 grams of this mixed oxide catalyst was charged to the reactor and tested. Results are tabulated in Table VIII.

tions of water vapor as indicated by a higher percent relative humidity.

EXAMPLE XI

About 20 cc of a commercial manganese dioxide on an alumina support was dried in a vacuum oven at a temperature of about 200° C. and a vacuum of approximately 27 inches of mercury for a period of 2.5 hours. The catalyst was about 19 percent manganese dioxide. The B.E.T. surface area of the catalyst was 69 square meters/gram.

Using the apparatus and procedure of Example II, about 17.8 grams of the catalyst was charged to the reactor. The loading was performed with the reactor temperature at 104° C. and with the synthetic air gas passing through the reactor. The synthetic air gas was preheated to approximately 105° C. during the loading. The relative humidity of the synthetic air gas was about 1.2 percent. This catalyst did not exhibit a significant level of activity as a vinyl chloride incineration catalyst. During the period in which vinyl chloride-containing synthetic air gas stream was passed through the catalyst, no oxidation of vinyl chloride occurred within the sensitivity of the analytical technique for vinyl chloride analysis. The inlet synthetic air gas had 41.5 ppm of vinyl chloride.

EXAMPLE XII

Manganese dioxide was prepared in accordance with the procedure described in Example IX except that after the addition of the potassium permanganate, about 25 grams of ¼ inch diameter activated alumina tablets (predried for about ½ hour in a 200° C. oven) were added to about 30 grams of the reaction mixture. The pellets were stirred gently with the reaction mixture for a period of 20 minutes. The pellets and reaction mixture were then poured slowly into 400 grams of distilled water with stirring. The pellets were washed by decantation with distilled water to remove soluble salts and

TABLE VIII

| Sample No. | Inlet Temp.[a] | Flow Rate[f] | % Rel. Humid.[b] | VCM Concentration[c] Inlet | Outlet | % Diff.[d] | Time of Operation[e] |
|---|---|---|---|---|---|---|---|
| 1 | 108 | 44 | 1.0 | 37.5 | 0.5 | 99 | 0.05 |
| 2 | 108 | 44 | 53 (6) | 37.5 | 16.5 | 55 | 0.15 |
| 3 | 108[g] | 44 | 1.0 | 37.5 | 6.0 | 85 | 0.35 |
| 4 | 111[h] | 44 | 1.5 | 37.5 | 2.0 | 95 | 0.10 |

[a-e] See Table II
[f] Total 80/20 N$_2$/O$_2$ flow rate in liters/hour.
[g] Sample obtained 6 minutes after discontinuing increased relative humidity atmosphere.
[h] Sample obtained after allowing catalyst to heat at 104° C. for approximately 7 days at 104° C. without gas flow through the reactor.

The data of Table VIII show that the manganese dioxide-copper (I) oxide mixture exhibits catalytic activity as a vinyl chloride incineration catalyst at 104° C. and that such activity is inhibited by higher concentraunadsorbed manganese dioxide which formed during hydrolysis. The washed pellets were dried at 200° C. under vacuum for a period of 3½ hours. The manganese content of the resultant coated alumina pellets was found to be about 1.7 weight percent as manganese dioxide.

Using the apparatus and procedure of Example II, 18 grams of this alumina supported manganese dioxide catalyst was charged to the reactor and tested. At vinyl chloride-containing synthetic air flow rates of 9 liters per hour, significant catalytic activity was exhibited. At least 95 percent of the initial concentration of vinyl chloride (40 ppm) was oxidized. The relative humidity of the gas stream to the reactor was about 3.5 percent. At such conditions and at a relative humidity of about 61 percent, 90 percent of the vinyl chloride was oxidized.

X-ray diffraction analysis of the commercial alumina supported manganese dioxide (Example XI) showed that the commercial sample contained crystalline manganese dioxide in the beta-manganese dioxide, pyrolusite form while the laboratory prepared sample (Example XII) was found to be predominately amorphous in structure.

Results of this example show that hydrated manganese dioxide on alumina support exhibits catalytic activity as a vinyl chloride incineration catalyst.

EXAMPLE XIII

To a solution of 34 grams of anhydrous sodium hydroxide dissolved in 68 grams of distilled water was added a solution of 60.8 grams of anhydrous copper sulfate in 200 grams of water with vigorous stirring. After addition of the copper sulfate solution, the reaction mass was stirred for a period of 15 minutes. The precipitated product was thoroughly washed with distilled water by decantation using a centrifuge. The precipitate was washed a total of four times. After washing, the product was isolated by filtration. The wet filter cake was dried at 50° C. for about 4 hours. After drying, the filter cake was broken up using a mortar and pestle into a minus 8 mesh particle size product. The minus 8, plus 30 mesh particle size fraction of this product was dried at about 200° C. for about 16 hours. The last hour of drying was conducted under a vacuum of 27 inches of mercury. The copper content of this catalyst was found to be about 94.7 weight percent, as copper (II) oxide by X-ray spectroscopic analysis. Thermogravimetric analysis of a sample of the copper oxide to 400° C. indicated a total weight loss of 3.5 percent.

Utilizing the apparatus and procedure of Example II, 15 grams of the aforesaid copper (II) oxide was tested as a vinyl chloride incineration catalyst as a reactor temperature of 104° C. The data collected appears in Table IX. Such data shows that at conditions of low relative humidity, copper (II) oxide is active as a vinyl chloride incineration catalyst at a reactor temperature of 104° C. The data also show that water vapor inhibits the catalytic activity.

EXAMPLE XIV

About 20 cc of a commercial copper (II) oxide catalyst was dried in a vacuum oven at a temperature of about 200° C. and a vacuum of approximately 27 inches of mercury for a period of about 4 hours. The catalyst was 99 weight percent copper oxide and had a B.E.T. surface area of about 5 square meters per gram.

Using the apparatus and procedure of Example II, about 25 grams of the catalyst was charged to the reactor and tested. The loading was performed with the reactor temperature at 104° C. and with the snythetic air gas mixture passing through the reactor. The synthetic air gas mixture was preheated to approximately 105° C. during the loading. The data collected appears in Table IX. This data show also that copper (II) oxide is active as a vinyl chloride incineration catalyst at a reactor temperature of 104° C. The data also show that water vapor inhibits the catalytic activity.

TABLE IX

| Oxide Tested | Inlet Temp.[a] | Flow Rate[f] | % Rel. Humid.[b] | VCM Concentration[c] | | % Diff.[d] | Total Time of Operation[e] |
|---|---|---|---|---|---|---|---|
| | | | | Inlet | Outlet | | |
| Copper (II)[g] | 110 | 44 | 0.8 | 42.0 | N.D. | >99 | 0.25 |
| | 110 | 44 | 0.8 | 42.0 | Trace | >99 | 0.60 |
| | 109 | 44 | 53 (6) | 42.0 | 27.0 | 35 | 0.75 |
| Copper (II)[h] | 108 | 44 | 1.1 | 42.0 | 27.5 | 35 | 0.30 |
| | 108 | 44 | 1.4 | 42.0 | 27.5 | 35 | 0.50 |
| | 108 | 9 | 2.0 | 42.0 | 10.0 | 75 | 0.65 |
| | 108 | 9 | 2.0 | 42.0 | 11.0 | 75 | 1.0 |
| | 108 | 9 | 60. | 42.0 | 29.5 | 30 | 1.15 |
| | 108 | 9 | 2.6 | 42.0 | 12.0 | 70 | 1.35 |

[a]See Table II
[f]Total 80/10-$N_2/O_2$ flow rate in liters per hour.
[g]Catalyst of Example XIII.
[h]Commercial copper catalyst (Example XIV)

The above examples demonstrate that hydrated metal oxide catalyst selected from the group consisting of the aforementioned oxides of manganese, copper and mixtures of said metal oxides show significant activity as a vinyl chloride incineration catalyst at temperatures of about 100° C., e.g., 100°–115° C. under conditions of low relative humidity. The data also show that such catalysts exhibit activity as a vinyl chloride incineration catalyst at ambient temperatures at conditions of low relative humidity. Although the activity at ambient temperatures does not appear to be as prolonged as the activity at, for example, 100° C., activity even for short periods at ambient temperature is significant. Even at high relative humidity conditions, e.g., 50 percent relative humidity, the catalysts described above show activity as a vinyl chloride incineration catalyst, although such activity is significantly less than at low relative humidity conditions, e.g., less than 5 percent.

The catalysts described above will find particular application in reducing vinyl chloride levels in air streams containing same. Thus, it is contemplated that vent discharges from enclosed work areas in polyvinyl chloride producing facilities, vinyl chloride storage tank facilities, etc. can be treated to reduce the vinyl chloride concentration of the vent gas appreciably by the process of the present invention.

The concentration of vinyl chloride in gas streams containing same, e.g., air streams, to be treated in accordance with the present process can vary. Commonly, the concentration in air streams will be below or above the explosive range. The concentration of vinyl chloride in air streams is typically maintained below 4 weight percent. It is contemplated therefore that the present process will find application to air streams that contain less than 4, e.g., less than 1 weight percent vinyl chloride. Further, the present process is useful for incineration of vinyl chloride at even low concentration levels, e.g., less than 0.05 weight percent (500 ppm) and even less than 0.01 weight percent (100 ppm). As the Examples illustrate, incineration of vinyl chloride and vinylidene chloride occurs even at concentrations less than 100 ppm, e.g., 50 ppm and 5 ppm respectively. Thus the range of vinyl chloride concentrations can vary from about 0.0005 (5 ppm) to 4 weight percent, e.g., from about 0.001 (10 ppm) to 0.1 (1000 ppm), more usually from 0.001 to 0.05 weight percent. With good ventilation, a range of from 0.001 (10 ppm) to 0.01 (100 ppm) weight percent vinyl chloride can be obtained.

In one application of the present invention, it is contemplated that vent gas streams containing vinyl chloride, e.g., vinyl chloride-containing air streams, will be dried to a low relative humidity, i.e., less than 5 percent, preferably less than about 2 percent, by absorption, adsorbtion, compression, cooling or compression and cooling. A simple and effective means for drying such a gas stream is to pass the gas through a drying column containing a solid or liquid desiccant, examples of which were previously described. The dried gas stream is then preheated to about 100°-200° C. by low pressure waste stream and introduced into a catalyst bed, e.g., fixed or fluid, containing the metal oxide catalyst(s) of the present invention. The bed can also be heated by the low pressure gas stream. The effluent gas from the reactor can be scrubbed by conventional techniques to remove product hydrogen chloride gas, e.g., in a caustic scrubber, and the innocuous effluent gas from the scrubbing means utilized discharged in an environmentally acceptable manner.

It is also contemplated that the metal oxides of the present invention can be used in protective breathing devices for individuals, e.g., a gas mask. The activity of the metal oxides of the present invention at ambient temperature, at least for short periods of time, can provide the time required for an individual to leave safely a contaminated area and reach a safety zone, i.e., a non-contaminated area. It is contemplated that any conventional gas mask can be modified to include an additional layer of the oxides of the present invention of such oxides can replace a catalytic material already contained in the gas mask.

Typically, a gas mask comprises a cannister assembly (cylindrical or rectangular) having sidewalls, a lower lid and an upper lid at opposite ends of the cannister which are sealed to the cannister assembly by O-rings or other suitable sealing means. The lids contain air inlet and outlet means. Within the cannister are a plurality of spaced, parallel screen assemblies between which are layers of adsorbents and catalysts to remove objectionable vapors from the air passing through the cannister. Typically the first layer with which the incoming air is contacted is activated charcoal followed by at least one layer of desiccant, e.g., caustic soda fused on pumice stone, fused calcium chloride, etc. Next, there can be placed the hydrated metal oxide(s) of the present process for the catalytic oxidation of vinyl chloride followed by a protective layer of desiccant to protect the catalyst against moisture reaching it from above. Typically the individual layers of adsorbents and catalysts are separated by parallel wire screens which often contain filters, e.g., cotton wool fibers. The air inlet conduit contains a check valve to allow air to pass in one direction, i.e., inwardly, and a filter to remove suspended solids included in the air intake. The air outlet is connected to a mouthpiece by means of nipple means attached to the cannister and inhalation hose means. The mouthpiece can also be provided with one way air discharge means for removing exhaled air from the wearer of the mask.

Although the present process has been described with reference to specific details of certain embodiments thereof, it is not intended that such details should be regarded as limitations upon the scope of the invention except as and to the extent that they are included in the accompanying claims.

We claim:

1. A method for reducing the vinyl chloride content of a vinyl chloride-containing gas stream, which comprises contacting the vinyl chloride of said gas stream with an oxidizing amount of oxygen-containing gas at temperatures of from 20° to 300° C. in the presence of hydrated metal oxide catalyst selected from the group consisting of copper (II) oxide, manganese (IV) oxide, manganese (III) oxide, manganese (II, III) oxide, and mixtures of such manganese oxides with copper (II) oxide or copper (I) oxide for a time sufficient to reduce said vinyl chloride content of the gas stream, said temperature being such as to inhibit water induced loss of catalyst activity.

2. The method of claim 1 wherein the amount of oxygen-containing gas is at least that amount which is required stoichiometrically to oxidize the carbon and hydrogen content of the vinyl chloride contained in the gas stream to carbon dioxide and water.

3. The method of claim 1 wherein the gas stream is an air stream.

4. The method of claim 3 wherein the gas stream contains from 0.0005 to 0.05 weight percent vinyl chloride.

5. The method of claim 1 wherein the temperature is between about 100° and about 200° C.

6. The method of claim 1 wherein the relative humidity of the gas contacting the catalyst is less than 5 percent.

7. The method of claim 1 wherein the hydrated metal oxide catalyst contains an amount of water of hydration at least as high as that obtained by drying an aqueous filter cake of precipitated metal oxide at 200° C.

8. The method of claim 1 wherein the hydrated metal oxide catalyst is manganese (IV) oxide, manganese (III) oxide or manganese (II, III) oxide.

9. The method of claim 8 wherein the relative humidity of the gas contacting the catalyst is less than about 2 percent.

10. A method for reducing the vinyl chloride content of a vinyl chloride-containing air stream, which comprises contacting said air stream with an oxidizing amount of oxygen-containing gas at temperatures within the range of from about 100° to about 250° C. in the presence of hydrated metal oxide catalyst selected from the group consisting of copper (II) oxide, manganese (III) oxide, manganese (IV) oxide, manganese (II, III) oxide, and mixtures of such manganese oxides with copper (II) oxide for a time sufficient to reduce said vinyl chloride content of said air stream, said temperature being such as to inhibit water induced loss of catalyst activity.

11. The method of claim 10 wherein the weight ratio of manganese oxide to copper oxide in the metal oxide mixture is in the range of from 1:1 to 15:1.

12. The method of claim 11 wherein the weight ratio is from about 6:1 to about 8:1.

13. The method of claim 10 wherein the oxygen-containing gas is dehumidified before contacting the vinyl chloride-containing air stream.

14. The method of claim 10 wherein vinyl chloride-containing gas stream is dehumidified before contacting the hydrated metal oxide catalyst.

15. The method of claim 10 wherein the relative humidity of the gas contacting the catalyst is less than 5 percent.

16. The method of claim 15 wherein the relative humidity is less than 2 percent.

17. A method for reducing the vinyl chloride content of a process air stream containing same, which comprises dehumidifying the vinyl chloride-containing air stream to a relative humidity of less than 5 percent, and passing the dehumidified stream in contact with hydrated metal oxide catalyst selected from the group consisting of copper (II) oxide, manganese (IV) oxide, manganese (III) oxide, manganese (II, III) oxide, and mixtures of such manganese oxides with copper (II) oxide or copper (I) oxide at from about 100° to about 250° C.

18. The method of claim 17 wherein the dehumidified stream is passed through a bed of the metal oxide catalyst.

19. The method of claim 17 wherein further dehumidified oxygen-containing gas is mixed with the dehumidified vinyl chloride-containing air stream so that the total amount of oxygen-containing gas is at least that amount which is required to oxidize the carbon and hydrogen content of the vinyl chloride contained in the mixed stream to carbon dioxide and water.

* * * * *